United States Patent [19]

Huber

[11] 4,285,984

[45] Aug. 25, 1981

[54] FLAVORING WITH DIALKYLAMINO-ALKYLENE MERCAPTANS AND SULFIDES

[75] Inventor: Ulrich Huber, Zurich, Switzerland

[73] Assignee: Givaudan Corporation, Clifton, N.J.

[21] Appl. No.: 45,523

[22] Filed: Jun. 4, 1979

Related U.S. Application Data

[63] Continuation of Ser. No. 821,128, Aug. 2, 1977, abandoned.

[30] Foreign Application Priority Data

Aug. 9, 1976 [AT] Austria .................................. 5900/76
Jun. 17, 1977 [CH] Switzerland .......................... 7462/77

[51] Int. Cl.$^3$ ...................... A23L 1/226; A23L 1/231
[52] U.S. Cl. .................................... 426/535; 131/276; 564/500; 564/501
[58] Field of Search ......................................... 426/535

[56] References Cited

U.S. PATENT DOCUMENTS 3,493,396  2/1970  Nakayama et al. .................. 426/535

OTHER PUBLICATIONS

Bedoukian, Progress in Perfumery Materials, *Cosmetics and Perfumery*, Apr. 1973.
Kleinfield, "In Taste and Smell Anythings's Possible," *The Washington Star*, Sunday, Dec. 4, 1977, pp. G-1, G-3.
Decision of the Federal Patent Court (Patent Office of the Federal Republic of Germany), 32nd Senate of 10/31/72, Ref. 32 W, p. 32/71.
Fenaroli's Handbook of Flavor Ingredients, Furia et al., vol. I 1975, CRC Press: Cleveland, pp. 132-177.
Bull. Soc. Chim. (France) (10), 1963, 2160.
C.A., 51 (1957) 4273f, 15452d.
C.A., 56 (1962) 14053e.
J. Chem. Soc. (1953), 2998.
C.A., 56 (1962) 14050f.
J. Org. Chem. 27, (1962) 2846-2853.
Tetrahedron, 18 (1962), 245-255.
C.A., 53 (1959) 9045i.

*Primary Examiner*—Joseph M. Golian
*Attorney, Agent, or Firm*—Robert F. Tavares; Thomas Cifelli, Jr.

[57] ABSTRACT

Dialkylamino-alkylene mercaptans and sulfides, useful for preparing flavoring compositions and foodstuffs and tobaccos, and process for preparing said compositions, foodstuffs and tobaccos.

16 Claims, No Drawings

FLAVORING WITH DIALKYLAMINO-ALKYLENE MERCAPTANS AND SULFIDES

This is a continuation of Ser. No. 821,128 filed Aug. 2, 1977, now abandoned.

FIELD OF THE INVENTION

This invention relates to flavorants, flavoring compositions, foodstuffs and tobaccos containing the same.

SUMMARY OF THE INVENTION

The flavoring compositions provided by the present invention contain a compound of the general formula

wherein $R_1$ and $R_2$ each represent a $C_{1-3}$-alkyl group, A represents an alkylene group which may be branched and R represents a hydrogen atom or the methyl, ethyl, formyl, acetyl or propionyl group or a group of the formula

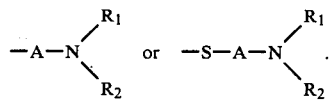

DESCRIPTION OF THE PREFERRED EMBODIMENTS

The $C_{1-3}$-alkyl group in the formula I compounds is the methyl, ethyl, propyl or isopropyl group. The methyl group is the preferred $C_{1-3}$-alkyl group. The symbol A represents a straight or branched chain alkylene group such as the methylene, ethylene, propylene or butylene group. The ethylene and propylene groups are the preferred alkylene groups. One or more of the hydrogen atoms of the alkylene chain can be substituted, in particular by methyl. R preferably represents a hydrogen atom or the methyl group.

Although a large number of the compounds of formula I are known, there is no disclosure in the corresponding literature sources that any of said compounds have any organoleptic properties.

It has now surprisingly been found in accordance with the present invention that the compounds of formula I possess particular flavouring properties and are, accordingly, very well suited as flavour-imparting ingredients in flavouring compositions The flavouring spectrum is very broad. The compounds of formula I possess fruity, spicy (e.g. mustard-like), vegetable-like (e.g. leek, celery, cauliflower, chive, onion, garlic, asparagus, rhubarb, tomato etc) and mushroom-like notes as well as cheese and meat notes. Of particular interest are the roast, meat and fish notes; for example, the notes of roast meat, poultry and fish, in particular tuna fish, sardines and anchovies. However, interesting egg and potato notes are also present.

The compounds of formula I can accordingly be used, for example, for the aromatisation of products such as foodstuffs, luxury goods and drinks, said compounds preferably not being used alone but rather in the form of compositions containing other flavouring substances.

The present invention is based on the finding mentioned earlier and is concerned in one aspect with a flavouring composition which contains as an essential flavour-imparting ingredient a compound of formula I hereinbefore in virtually pure form or in the form of mixtures (with the exception of mixtures which contain compounds of formula I and which originate from natural sources).

The invention is also concerned in another aspect with a process for the manufacture of the flavouring compositions aforesaid, which process comprises adding a compound of formula I in virtually pure form or in the form of mixtures (with the exception of mixtures which contain compounds of formula I and which originate from natural sources) to known flavouring compositions or mixing a compound of formula I in virtually pure form or in the form of mixtures (with the exception of mixtures which contain compounds of formula I and which originate from natural sources) with natural or synthetic compounds or mixtures thereof suitable as constituents of flavouring compositions.

In yet another aspect, the invention is concerned with a method of imparting a flavour to materials, which method comprises applying to said materials or incorporating therein a flavour-imparting amount of a compound of formula I in virtually pure form or in the form of mixtures (with the exception of mixtures which contain compounds of formula I and which originate from natural sources) or of a flavouring composition as hereinbefore defined.

As already mentioned, the flavouring compositions provided by the present invention should contain the compounds of formula I in virtually pure form or in the form of mixtures, with the exception of mixtures which contain compounds of formula I and which originate from any natural sources.

The expression "virtually pure" is used herein to mean, in particular, that the compounds of formula I are free from the impurities which are present in addition to the compounds of formula I in mixtures originating from any natural sources. As virtually pure compounds I in the scope of the present invention, there are to be understood, in particular, those compounds which are synthetically prepared.

The compounds of formula I can be used as flavouring substances, for example, for the production of improvement, intensification, enhancement or modification of fruit, meat, vegetable, cheese, mushroom-like, spicy or roast notes in foodstuffs (e.g. meat, fish, seafood products, meat-substitute products, sauces, broths, soups such as dry soups, vegetables such as various type of cabbage, legumes, leeks and onions, spicing agents such as mustard, ketchup and soya sauce, flavour strengtheners, snack food, roasted products such as nut products, coffee or cocoa, dairy products such as cheese, quark and yoghurt etc), in luxury goods (e.g. tobacco, chocolate; crackers etc) and drinks (e.g. lemonades etc). The term "foodstuffs" in the claims includes all of the foregoing except tobacco.

The pronounced flavour qualities of the compounds of formula I enable them to be used in low concentrations. A suitable range is ca 0.001 ppm–100 ppm, preferably ca 0.1 ppm–10 ppm, in the finished product (i.e. the flavoured foodstuff, luxury goods or drink).

The compounds of formula I can be mixed with the constituent used for flavouring compositions, preferably together with other flavour-imparting ingredients and/or adsorption and carrier substances and/or diluents, enveloping (encapsulating) substances, emulsifiers, stabilising agents etc, or added to such flavours in the customary manner. Among the flavours contemplated according to the present invention there are to be understood flavouring compositions which can be diluted or dispersed in edible materials in a manner known per se. They can be converted into the customary forms of use such as solutions, pastes or powders, according to methods known per se. The products can be spray-dried, vacuum dried or lyophilised. The formulation of these synthetic flavours and the flavouring of the products can also be carried out in a manner known per se [see J. Merory; Food flavourings, composition, manufacture and use; Avi Publ. Co. Inc. Westport (1968), or A. M. Burger; die natürlichen and künstlichen Aromen; A. Hüthig, Verlag Heidelberg 1968].

Examples of suitable carriers, thickeners, flavour-improvers, spices, auxiliary ingredients and the like which can be used in the production of such customary forms of use are:

Exudates, guar gum, tara gum, pectin, xanthane, modified starches and celluloses, gum arabic, tragacanth, salts or brewers' yeast, alginates, carrageens or similar absorbants; flavour-imparting ingredients, maltol, spice oil resins, smoke flavours; cloves, meat extract, Maillard products, sodium citrate; monosodium glutamate, disodium inosine-5'-monophosphate (IMP), disodium guanosine-5-phosphate (GMP); milk and cheese powder; special flavour substances, diluents such as water, ethanol, propyleneglycol, glycerine, benzyl alcohol, citric acid esters, fatty acid esters, olive oil; stabilising agents such as antioxidants (e.g. butylated hydroxytoluene, butylated hydroxyanisole etc, buffer substances such as, for example, phosphates, citrates etc.

The concentration of the compounds of formula I in the flavour compositions can vary within a wide range (e.g. between about 1 ppm and $100^\circ/_{oo}$). A preferred range is between 10 ppm and $10^\circ/_{oo}$.

The following Table illustrates suitable concentrations of flavour substances in various forms of application:

TABLE

| Form of use | General | Preferred |
|---|---|---|
| Compositions in liquid form e.g. Solutions [in water, alcohols (ethanol, glycerine, benzyl alcohol, propyleneglycol etc.), esters (e.g. citric acid esters, fatty acid esters)] | 1 ppm-10 $^\circ/_{oo}$ | 10 ppm-10 $^\circ/_{oo}$ |
| Pastes | 10 ppm-50 $^\circ/_{oo}$ | 100 ppm-10 $^\circ/_{oo}$ |
| Spray-dried powders | 50 ppm-100 $^\circ/_{oo}$ | 300 ppm-30 $^\circ/_{oo}$ |
| Lyophilised vacuum dried powders | 50 ppm-100 $^\circ/_{oo}$ | 300 ppm-30 $^\circ/_{oo}$ |
| Adsorbed powders (adsorbates) | 50 ppm-100 $^\circ/_{oo}$ | 300 ppm-30 $^\circ/_{oo}$ |
| Diluting agent for foodstuffs | 50 ppb-100 ppm | 300 ppb-30 ppm |
| Structured proteins for meat substitutes | 50 ppb-100 ppm | 300 ppb-30 ppm |
| Dip sauces | 50 ppb-100 ppm | 300 ppb-30 ppm |
| Cocktail sauces | 50 ppb-100 ppm | 300 ppb-30 ppm |
| Meat sauces | 100 ppb-100 ppm | 200 ppb-20 ppm |
| Potato stock | 50 ppb-100 ppm | 300 ppb-30 ppm |
| Soups | 10 ppb-50 ppm | 100 ppb-10 ppm |
| Meat preserves | 10 ppb-50 ppm | 100 ppb-10 ppm |
| Ready-made dishes (e.g. meat dishes) | 10 ppb-50 ppm | 100 ppb-10 ppm |
| Meat extracts and Maillard products | 10 ppm-50 $^\circ/_{oo}$ | 100 ppm-10 $^\circ/_{oo}$ |
| Spice agent | 10 ppm-50 $^\circ/_{oo}$ | 100 ppm-10 $^\circ/_{oo}$ |
| Cheese powder and cheese extender | 50 ppb-100 ppm | 300 ppb-30 ppm |
| Vegetable powder and extender | 50 ppb-100 ppm | 300 ppb-30 ppm |

In special cases, the compounds of formula I can also be added alone to the products to be flavoured. In this case particular care must be taken during the addition to achieve a uniform dispersion of such a compound in the product being aromatised.

The following Table lists compounds of formula I which are of particular interest having regard their aroma properties:

TABLE

| Compound | Aroma |
|---|---|
| $(CH_3)_2N(CH_2)_3SH$ | after sardines, tuna fish |
| $(CH_3)_2N(CH_2)_3SCH_3$ | potato-like, fatty |
| $(CH_3)_2N(CH_2)_3SCOCH_3$ | meat-like, tuna fish, roast note in particular |
| $(CH_3)_2N(CH_2)_2SH$ | meat-like, slight fish note, penetrating |
| $(CH_3)_2N(CH_2)_2SCH_3$ | after green tomatoes, potatoes |
| $(C_2H_5)_2 N(CH_2)_2SH$ | meat-like, potato-like, interesting roast note, spicy |
| $(i\text{-}Prop)_2N(CH_2)_2SH$ | after meat pastry |
| $(i\text{-}Prop)_2N(CH_2)_2SCOCH_3$ | meat-like, after sardines |
| $(CH_3)_2N(CH_2)_2SS(CH_2)_2N(CH_3)_2$ | after vegetables, cabbage |
| $(CH_3)_2N(CH_2)_3S(CH_2)_3N(CH_3)_2$ | fatty, interesting roast note, after roast meat |
| $(CH_3)_2N(CH_2)_3SS(CH_2)_3N(CH_3)_2$ | after potatoes, fish, amine-like |
| $(CH_3)_2NCH(CH_3)CH_2SH$ | after beef, interesting roast note |
| $(CH_3)_2NCH(CH_3)CH_2SCOCH_3$ | after roast meat, roast note |
| $(C_2H_5)_2N(CH_2)_4SH$ | after fried fish |
| $(CH_3)_2NCH_2CH(CH_3)SCH_3$ | after cheese, strong |
| $(CH_3)_2NCH(CH_3)CH_2SCH_3$ | after sauerkraut, cabbage. |

The following Examples illustrate the present invention:

EXAMPLE 1

A dip mix for sauce can be prepared as follows:

40.0 g of a mixture consisting of

|  | Parts by weight |
|---|---|
| *Sour cream, spray dried (e.g. SAA-creme-H) | 89.4 |
| Sodium glutamate | 7.29 |
| Hydrolysed vegetable protein (e.g. HPP, Type RF-B, oil-coated) | 1.66 |
| Citric acid | 0.17 |
| Pepper aroma | 0.17 |
| Marjoram aroma | 0.03 |
| Thyme aroma | 0.03 |
| Curcuma aroma | 0.26 |
| Salt | 0.66 |
| Mustard powder | 0.33 |
|  | 100.00 |

*spray-dried sour cream base with vegetable fat.

are mixed and dissolved with 50 ml of water while stirring.

The flavour of this dip sauce is weak and uncharacteristic. By adding 3–5 ppm of 2-diisopropylaminoethyl-mercaptan, the resulting dip sauce is given a pleasant, meat-like note which harmonises well with the existing spice note.

EXAMPLE 2

A cocktail sauce aroma can have the composition A or B:

|  | Parts by weight | |
|---|---|---|
|  | A | B |
| Levulinic acid | 10 | 10 |
| Raspberry ketone (p-hydroxyphenylbutone) | 10 | 10 |
| Dimethyl disulphide (1% in propyleneglycol) | 1 | 1 |
| Dimethyl sulphide (1% in propyleneglycol) | 2 | 2 |
| Piperidine | 5 | 5 |
| Thiolactic acid | 5 | 5 |
| 3-Acetylpyridine | 10 | 10 |
| Terpinen-4-ol | 3 | 3 |
| Trimethylamine (25% in propyleneglycol) | 40 | 40 |
| Propyleneglycol | 914 | 913.5 |
| S-Acetyl-2-diisopropylaminoethylmercaptan (1% in propyleneglycol) |  | 0.5 |
|  | 1000 | 1000 |

At an amount of 200 g/100 liters of cocktail sauce, the odour and flavour of composition A are insipid.

By adding S-acetyl-2-diisopropylaminoethylmercaptan, the flavour is greatly improved in that a note emerges which is strongly reminiscent of sardines (Composition B).

A similar effect is achieved by using 0.5 parts by weight of a 1% propyleneglycol solution of 4-diethylaminobutylmercaptan in place of S-acetyl-2-diisopropylaminoethylmercaptan.

EXAMPLE 3

A cocktail sauce aroma can have the composition A or B:

|  | Parts by weight | |
|---|---|---|
|  | A | B |
| Levulinic acid | 10 | 10 |
| Raspberry ketone | 10 | 10 |
| Dimethyl disulphide (1% in propyleneglycol) | 1 | 1 |
| Dimethyl sulphide (1% in propyleneglycol) | 2 | 2 |
| Piperidine | 5 | 5 |
| Thiolactic acid | 5 | 5 |
| 3-Acetylpyridine | 10 | 10 |
| Terpinen-4-ol | 3 | 3 |
| Trimethylamine (25% in propyleneglycol) | 40 | 40 |
| Propyleneglycol | 914 | 913.5 |
| 2 Diemthylaminoethylmercaptan (1% in propyleneglycol) |  | 0.5 |
|  | 1000 | 1000 |

At an amount of 200 g/100 liters of cocktail sauce, the odour and flavour of composition A are insipid.

By adding 2-dimethylaminoethylmercaptan the flavour is greatly improved, the note which now emerges being reminiscent of anchovies (Composition B).

EXAMPLE 4

A cocktail sauce aroma can have the composition A or B:

|  | Parts by weight | |
|---|---|---|
|  | A | B |
| Levulinic acid | 10 | 10 |
| Raspberry ketone | 10 | 10 |
| Dimethyl disulphide (1% in propyleneglycol) | 1 | 1 |
| Dimethyl sulphide (1% in propyleneglycol) | 2 | 2 |
| Piperidine | 5 | 5 |
| Thiolactic acid | 5 | 5 |
| 3-Acetylpyridine | 10 | 10 |
| Terpinen-4-ol | 3 | 3 |
| Trimethylamine (25% in propyleneglycol) | 40 | 40 |
| Propyleneglycol | 914 | 913.5 |
| 2 Diemthylaminoethylmercaptan (1% in propyleneglycol) |  | 0.5 |
|  | 1000 | 1000 |

At an amount of 200 g/100 liters of cocktail sauce, the odour and flavour of the composition are insipid.

By adding 3-dimethylaminopropylmercaptan the flavour is modified in an advantageous manner in that a note now emerges which is reminiscent of sardines and tuna fish (Composition B).

3-Dimethylaminopropyldisulphide can be used in the foregoing flavour in place of 3-dimethylaminopropylmercaptan.

EXAMPLE 5

A brown meat sauce can be prepared as follows:
20 g of a mixture consisting of

|  | Parts by weight |
|---|---|
| Dry meat extract, finely ground | 18 |
| Vegetable fat | 15 |
| Roast onion flavour | 0.4 |
| Salt | 5.6 |
| Sodium glutamate | 16 |
| Hydrolysed vegetable protein | 20 |
| Caramel powder | 1 |
| Coriander powder | 0.3 |
| Marjoram flavour | 0.1 |
| Bay leaf flavour | 0.12 |
| Citric acid | 0.28 |
| Modified potato starch | 23.20 |
|  | 100.00 | are stirred in 1 liter of cold water and boiled while stirring continuously. After boiling for 3 minutes, the odour and flavour of this sauce are weak and uncharacteristic.

After adding 3–5 ppm of S-acetyl-3-dimethylaminopropylmercaptan, an excellent roast meat note is observed.

EXAMPLE 6

A potato flavour composition can have the composition A or B:

|  | Parts by weight | |
|---|---|---|
|  | A | B |
| Valerianic acid | 0.3 | 0.3 |
| Vanillin | 1.2 | 1.2 |
| Ethyl butyrate | 2.5 | 2.5 |
| Lactic acid | 2.5 | 2.5 |
| Butyric acid | 2.5 | 2.5 |
| Diacetyl | 3.0 | 3.0 |
| Methional | 60.0 | 40.0 |
| (3-Dimethylaminopropyl)-methyl | | |

-continued

|  | Parts by weight | |
|---|---|---|
|  | A | B |
| sulphide |  | 20.0 |
| Ethyl alcohol | 928.0 | 928.0 |
|  | 1000.0 | 1000.0 |

A comparison of A and B shows that composition A is greatly inferior.

By partly replacing methional by (3-dimethylaminopropyl)-methyl sulphide an improvement in flavour emerges. Composition B has a pronounced potato note which is reminiscent of potato chips.

EXAMPLE 7

A cheese aroma can have a composition A or B:

|  | Parts by weight | |
|---|---|---|
|  | A | B |
| Lactic acid | 10 | 10 |
| Ethyl butyrate | 30 | 30 |
| Ammonium isovalerate | 30 | 30 |
| i-Valerianic acid | 50 | 50 |
| Caproic acid | 60 | 60 |
| Butyric acid | 120 | 120 |
| (2-Dimethylaminoethyl)-methyl sulphide |  | 5 |
| Propyleneglycol | 700 | 695 |
|  | 1000 | 1000 |

A comparison of A and B shows that the customary composition A is greatly inferior.

By adding (2-dimethylaminoethyl)-methyl sulphide, the cheese flavour in composition B is strengthened in an advantageous manner, the composition being reminiscent of Cheddar cheese.

EXAMPLE 8

A clear meat soup can be prepared as follows:
20.0 g of a mixture consisting of

|  | Parts by weight |
|---|---|
| Salt | 50.15 |
| Sodium glutamate | 20.0 |
| Caramel powder | 0.2 |
| Nutmeg flavour | 0.05 |
| Clove flavour | 0.05 |
| Pepper flavour | 0.05 |
| Hydrolysed vegetable protein | 11.5 |
| Vegetable fat (melting point 40° C.) | 17.0 |
| Onion powder | 1.0 |
|  | 100.0 | is placed in 1 liter of hot water.

The flavour of this soup is weak and uncharacteristic. By adding 3-5 ppm of 2-diethylaminoethylmercaptan the meat flavour present is strengthened in an advantageous manner and, in addition, a pleasant roast meat note now emerges which harmonises well with the meat flavour.

EXAMPLE 9

Imitation dry bacon pieces (bits) containing the following ingredients can be prepared:

|  | Parts by weight |
|---|---|
| Coloured texturised soya protein | 750 g |
| Palm kernel fat (melting point 32°-34° C.) | 160 g |
| Cooking salt | 50 g |
| Sodium glutamate | 10 g |
| Vegetable protein hydrolysate | 25 g |
| Pepper flavour | 2.7 g |
| Onion flavour | 0.2 g |
| Garlic flavour | 0.1 g |
| Smoke flavour | 2 g |
|  | 1000 g |

The ingredients, with the exception of the soya protein, are mixed well in a mixer with the molten palm kernel fat and dried, together with the soya protein, in a tumble drier at 35°.

The granular mass solidifies upon cooling. This product can be used as an adjunct to, or replacement for, bacon in omelettes, with beans, in soups and sauces, in sandwiches and salads etc.

The product shows, however, a somewhat insipid and unspecific flavour. By adding 2-5 ppm of 2-diethylaminoethylmercaptan and/or 2-5 ppm of 2-diisopropylaminoethylmercaptan to the fat suspension, the imitation dry bacon pieces prepared therefrom have a meaty, smoky bacon-like pleasant character.

EXAMPLE 10

An all-purpose seasoning powder containing the following ingredients can be prepared:

|  | Parts by weight |
|---|---|
| Cooking salt | 354 g |
| Sodium glutamate | 200 g |
| Vegetable protein hydrolysate | 200 g |
| Maize starch | 100 g |
| Palm kernel fat (melting point 32°-34° C.) | 50 g |
| Onion powder | 50 g |
| Yeast autolysate | 25 g |
| Turmeric powder | 13 g |
| 2-Dimethylaminopropylmercaptan (1% in propyleneglycol) | 8 g |
|  | 1000 g |

The turmeric powder is emulsified in the palm kernel fat and then blended with the remaining ingredients. The resulting powder is suitable for the seasoning of foodstuffs not only during cooking but also at the table.

By omitting the 2-dimethylaminopropylmercaptan there is obtained an uncharacteristic seasoning powder which lacks the desired meaty note.

EXAMPLE 11

An extended (stretched) cheese powder containing the following ingredients can be prepared:

|  | Parts by weight |
|---|---|
| Cheese powder | 500 g |
| Pre-cooked maize starch | 50 g |
| Buttermilk powder | 150 g |
| Maltodextrin | 285 g |
| Cooking salt | 4.9 g |
| Citric acid | 5 g |
| Sodium citrate | 5 g |
| (2-Dimethylaminopropyl)-methylsulphide (1% in propyleneglycol) | 0.1 g |

| | Parts by weight |
|---|---|
| | 1000 g |

The ingredients are mixed well to give a cheese-like product which is suitable for the seasoning of spaghetti, pizzas, soups, pastries, dip sauces etc.

When the (2-dimethylaminopropyl)-methylsulphide is not added, the product has a bland and insipid flavour.

EXAMPLE 12

A ready seasoned partial hamburger premix (i.e. a meat extender containing soya protein can be prepared as follows:

| | Parts by weight |
|---|---|
| Textured soya protein (textured soya) (Miratex 210) and | 700 g |
| Palm kernel fat (melting point 32°-34° C.) are mixed in a mixer-drier at 35° C. and treated with: | 70 g |
| Cooking salt | 30 g |
| Sodium glutamate | 10 g |
| Vegetable protein hydrolysate | 16 g |
| Pepper flavour | 2.3 g |
| Onion flavour | 0.5 g |
| Garlic flavour | 0.2 g |
| 3-Dimethylaminopropylsulphide (1% in propyleneglycol) | 1 g. |
| By admixture of Egg powder and | 70 g |
| Dried onion flakes | 100 g |
| there is obtained of a stable powder which is mixed with | 1000 g |
| Minced beef and | 2400 g |
| Water | 1600 g | and fried in portions to give hamburgers with a pleasant rost meat odour.

If the 3-dimethylaminopropylsulphide is not added, then the hamburger tastes weak and insipid. On the other hand, if the 3-dimethylaminopropylsulphide is replaced by a similar amount of 5-acetyl-3-dimethylaminopropylmercaptan, then an excellent roast meat note is realized.

Unless they are described in the literature, the compounds of formula I can be prepared in a manner known per se. A summary of the preparative methods is given in the following Table:

TABLE

| Method (*) | Products (Formula I) | Educts | | Solvent (e.g.) | Temperature range (e.g.) |
|---|---|---|---|---|---|
| B | N,N-Dialkylamino-alkyl-mercaptan | S-Acyl-dialkyl-amino-alkyl-mercaptan (2) | (Educt brought into contact with the solvent, e.g. for a few minutes to several days) | Methanol, ethanol, propanol, water | 0°-100° C., especially 20°-65° C. |
| C | N,N-Dialkylamine-alkyl sulphide | Dialkylamino-alkyl halide (1) | Alkylmercaptan | Base Organic solvent, especially two-phase system NaOH benzene, KOH/benzene or NaOH/ether, KOH/ether | 0 -100° C., especially 20°-60° C., |
| A | S-Acyl-dialkylamino-alkylmercaptan | Dialkylamino-alkyl halide (1) | Thio-alkane-carboxylic acid or salt (e.g. alkali metal salt) | Organic, especially aprotic solvent, e.g. chloroform, water | 0°-100° C., especially 20°-60° C. |
| E | N,N-Dialkylamino-alkyl-disulphide | Dialkylamino-alkylmercaptan. | Oxidising agent, e.g. $I_2$, $O_2$, $H_2O_2$ or organic or inorganic peroxide | NaOH/ether, as C | −80° C. to 100° C., especially 10°-30° C. |
| D | N,N-Dialkylamino-alkyl sulphide | Dialkylamino-alkyl halide (1) | Alkali metal hydrogen sulphide | NaOH/Benzene, as C | 0°-100° C., especially 20°-60° C. |

(*) See the following Examples.
(1) Chloride, bromide, iodine.
(2) Conveniently containing a readily cleavable acyl group such as formyl, acetyl, propionyl, benzoyl.

EXAMPLE 1 (Method A)

100 g of 3-dimethylamino-1-propyl chloride hydrochloride are dissolved in 1.2 liters of chloroform and 192 g of triethylamine are added. 54 ml of thioacetic acid are added dropwise and the mixture is kept at the reflux temperature for 18 hours. The cooled solution is washed three times with 500 ml of 1-N sodium hydroxide and once with 500 ml of water. The aqueous phases are extracted with chloroform and the combined chloroform phases are dried, concentrated and distilled at 86°-89° C./10 mmHg. In this manner, 91.3 g (89.5%) of pure S-acetyl-3-dimethylaminopropylmercaptan are obtained.

The following compounds are obtained according to the same method:

| | |
|---|---|
| S-acetyl-3-dimethylamino-propylmercaptan: | 38°-44° C./0.04 mmHg; |
| S-acetyl-2-diisopropyl-aminoethylmercaptan: | 102°-108° C./10 mmHg; and |

| S-acetyl-2-dimethylamino- | |
| --- | --- |
| propylmercaptan: | 84°–87° C./11 mmHg. |

EXAMPLE 2 (Method B)

86.4 g of S-acetyl-3-dimethylaminopropylmercaptan are held at the reflux temperature for 15 hours in 900 ml of methanol. The methanol is then distilled off and the residue distilled at 150°–155° C. under normal pressure. In this manner, 44.2 g (69% yield) of pure 3-dimethylaminopropylmercaptan are obtained; boiling point 42° C./10 mmHg.

The following compounds are obtained according to the same method:

| 2-Diisopropylaminoethylmercaptan: | 72°–74°/10 mmHg; |
| --- | --- |
| 2-dimethylaminopropylmercaptan: | 125°–145° C.; |
| 2-dimethylaminoethylmercaptan: | 124°–128° C.; and |
| 2-diethylaminoethylmercaptan: | 160° C. |

EXAMPLE 3 (Method C)

10 g of 1-dimethylaminopropyl-2-chloride hydrochloride, 100 ml of 2-N aqueous sodium hydroxide solution, 100 ml of benzene and 0.8 g of benzyl-triethylammonium chloride are introduced into a flask and ca 20 g of methylmercaptan are introduced for 40 minutes at room temperature while stirring. The mixture is then held at the reflux temperature for 4 hours. The benzene phase is concentrated and distilled, and gives, at 165°–168° C, 2.4 g (29% yield) of a mixture of [1-dimethylaminopropyl(2)]-methyl sulphide (a) and 2-dimethylaminopropylmethyl sulphide (b) in the ratio of 15 to 85. The two products can be separated by preparative gas chromatography or column chromatography.

Identifying properties
compound a:
gas chromatography, Carbowax 100° C., retention time 2½ min.;
NMR (CDCl$_3$) δ = 1,25 ppm/D 3H (>CH—CH$_3$)
compound b:
gas chromatography, Carbowax 100° C., retention time 4 min.;
NMR (CDCl$_3$) δ = 1,17 ppm/D 3H (>CH—CH$_3$)

The following compounds are obtained according to the same method:

| 3-Dimethylaminopropylmethyl sulphide: | 90°–100° C./25 mmHg; |
| --- | --- |
| and 2-dimethylaminoethylmethyl sulphide: | 130°–133° C. |

EXAMPLE 4 (Method D)

10 g of 3-dimethylaminopropyl chloride hydrochloride, 100 ml of 2-N sodium hydroxide solution, 100 ml of benzene, 0.5 g of benzyl-triethylammonium chloride hydrochloride and 6.7 g of NaHS.H$_2$O (70%) are held at the reflux temperature in a flask for 24 hours. The aqueous phase is then extracted three times with 50 ml of ether each time, the combined organic phases are washed with water, concentrated and fractionally distilled at 75°–85° C./0.025 mmHg. 1.35 g (21%) of 3-dimethylaminopropyl sulphide (are obtained in the form of a clear colourless liquid.

EXAMPLE 5 (Method E)

Iodine is added portionwise to a mixture of 4 g of 3-dimethylaminopropylmercaptan in 60 ml of ether and 30 ml of 2-N sodium hydroxide solution until the solution is no longer decolorised each time (ca 4.2 g of iodine). After stirring for 1 hour, the ether phase is dried over magnesium sulphate, concentrated and fractionally distilled at 95°–100° C./0.025 mmHg. 2.7 g (68%) of 3-dimethylaminopropyl disulphide are obtained in the form of a clear colourless liquid.

The following compound is obtained according to the same method:

2-Dimethylaminoethyl disulphide: 130°–132° C./10 mmHg.

What is claimed is:

1. A flavoring composition for foodstuffs containing from about 1 ppm to about 10 percent of at least one virtually pure compound having the formula

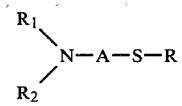

wherein:
R$_1$ and R$_2$ each represent a C$_{1-3}$ alkyl group,
A represents an alkylene group of from one to four carbons
R represents hydrogen, methyl, ethyl, formyl, acetyl propionyl or a group of the formula

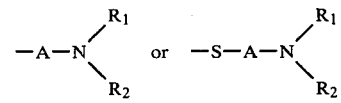

to impart a roast, meat, cheese, fish, poultry, vegetable-like, or mushroom-like taste, and at least one other compatible flavoring agent.

2. A composition according to claim 1 which contains a synthetically-prepared compound.

3. A composition according to claim 1, wherein R$_1$ and R$_2$ each represent the methyl group, A represents the ethylene or propylene group and R represents a hydrogen atom or the methyl group.

4. A composition according to claim 1, wherein the compound is 3-dimethylaminopropylmercaptan.

5. A process for preparing flavoring compositions which comprises incorporating, with at least one other compatible flavoring agent or composition, about 1 ppm to about 10 percent of at least one virtually pure compound having the formula

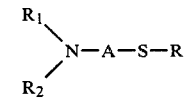

wherein:
R$_1$ and R$_2$ each represent a C$_{1-3}$ alkyl group,
A represents an alkylene group of from one to four carbons which may be branched, and
R represents hydrogen, methyl, ethyl, formyl, acetyl, propionyl or a group of the formula

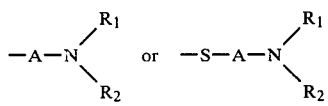

to impart a roast, meat, cheese, fish, poultry, vegetable-like or mushroom-like taste.

6. A process according to claim 5, wherein a synthetically-prepared compound is used.

7. A process according to claim 5, wherein $R_1$ and $R_2$ each represent the methyl group, A represents the ethylene or propylene group and R represents a hydrogen atom or the methyl group.

8. A process according to claim 5, wherein 3-dimethylaminopropylmercaptan is used.

9. A process for flavoring foodstuffs which comprises adding thereto from about 0.001 ppm to about 100 ppm of at least one compound, in virtually pure form, having the formula

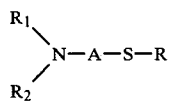

wherein:

$R_1$ and $R_2$ each represent a $C_{1-3}$ alkyl group,

A represents an alkylene group of from one to four carbons

R represents hydrogen, methyl, ethyl, formyl, acetyl, propionyl or a group of the formula

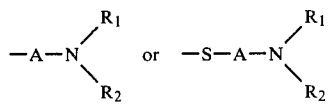

10. A process according to claim 9, wherein a synthetically-prepared compound or a flavoring composition containing same is used.

11. A process according to claim 9, wherein a compound in which $R_1$ and $R_2$ each represent the methyl group, A represents the ethylene or propylene group and R represents a hydrogen atom or the methyl group or a flavoring composition containing same is used.

12. A process according to claim 9, wherein 3-dimethylaminopropylmercaptan or a flavoring composition containing same is used.

13. A foodstuff which has been flavored according to the process of claim 9.

14. A foodstuff according to claim 13 wherein the compound is synthetically prepared.

15. A foodstuff according to claim 13 wherein:
$R_1$ and $R_2$ represent methyl groups,
A represents ethylene or propylene, and
R represents hydrogen or methyl.

16. A foodstuff according to claim 13 wherein the compound is 3-dimethylaminopropylmercaptan.

* * * * *